(12) United States Patent
Lewis et al.

(10) Patent No.: US 8,073,483 B2
(45) Date of Patent: Dec. 6, 2011

(54) DEVICE ROTATION FOR SIM SELECTION

(75) Inventors: John Lewis, Lawrenceville, GA (US);
Justin McNamara, Atlanta, GA (US);
Fulvio Cenciarelli, Suwanee, GA (US);
Jeffrey Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 397 days.

(21) Appl. No.: 12/340,108

(22) Filed: Dec. 19, 2008

(65) Prior Publication Data
US 2010/0159874 A1      Jun. 24, 2010

(51) Int. Cl.
*H04M 1/00* (2006.01)

(52) U.S. Cl. .................................. 455/550.1; 455/552.1

(58) Field of Classification Search ............... 455/550.1, 455/552.1
See application file for complete search history.

(56) References Cited

U.S. PATENT DOCUMENTS

| | | | |
|---|---|---|---|
| 5,758,267 A * | 5/1998 | Pinder et al. ................. | 455/90.2 |
| 6,411,828 B1 * | 6/2002 | Lands et al. ................ | 455/569.1 |
| 2008/0059888 A1 * | 3/2008 | Dunko ......................... | 715/744 |

* cited by examiner

*Primary Examiner* — Marisol Figueroa
(74) *Attorney, Agent, or Firm* — Woodcock Washburn LLP

(57) ABSTRACT

A device having multiple configurations, wherein each configuration allows operation of the device according to features that may be different than other configurations. Each of the configurations is controlled by a separate SIM card. The device is configured to select an operating configuration, and associated SIM card, in response to detecting an orientation of the device. As the orientation of the device changes, the device selects an operating configuration in accord with user intent.

21 Claims, 17 Drawing Sheets

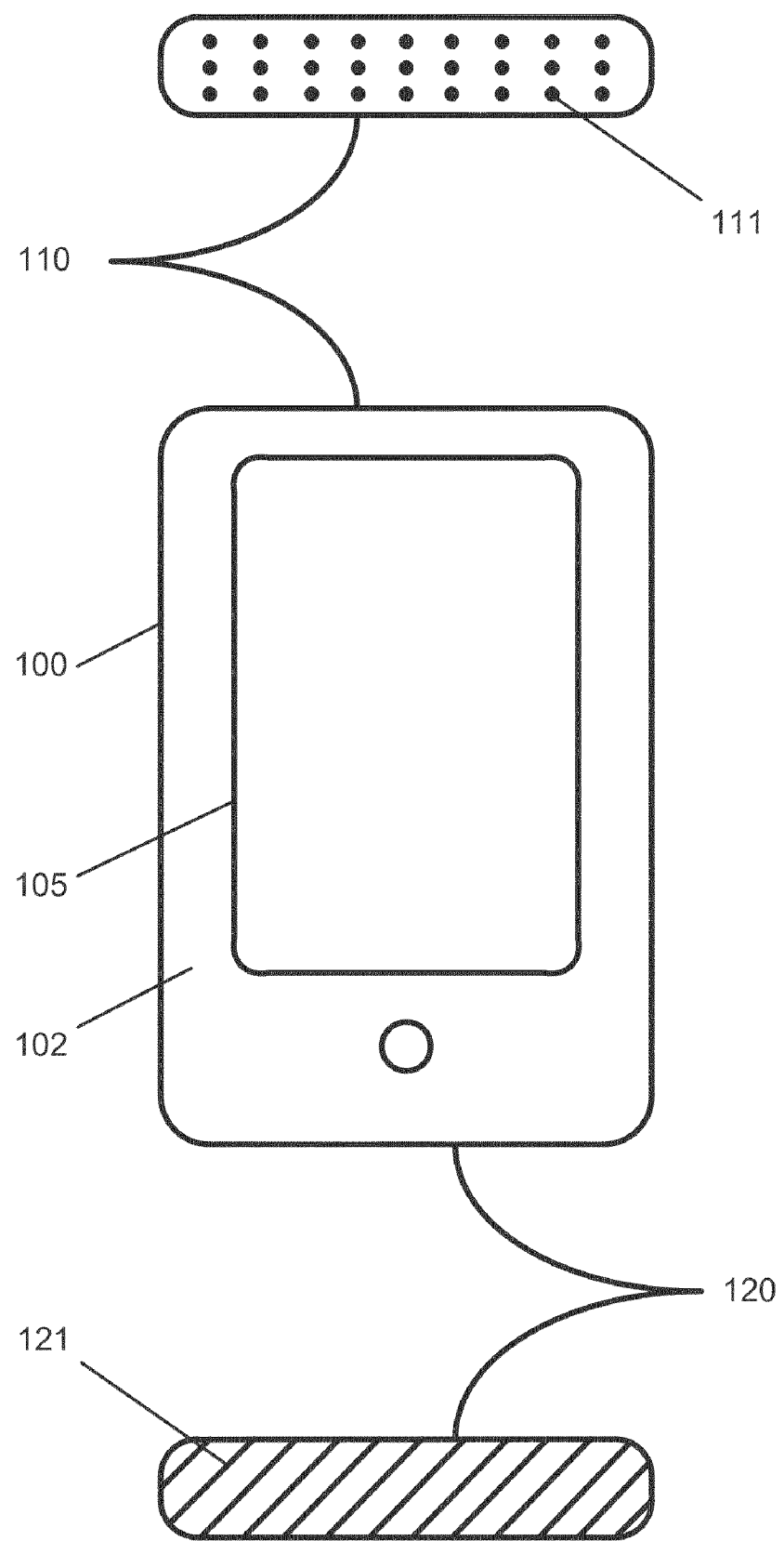

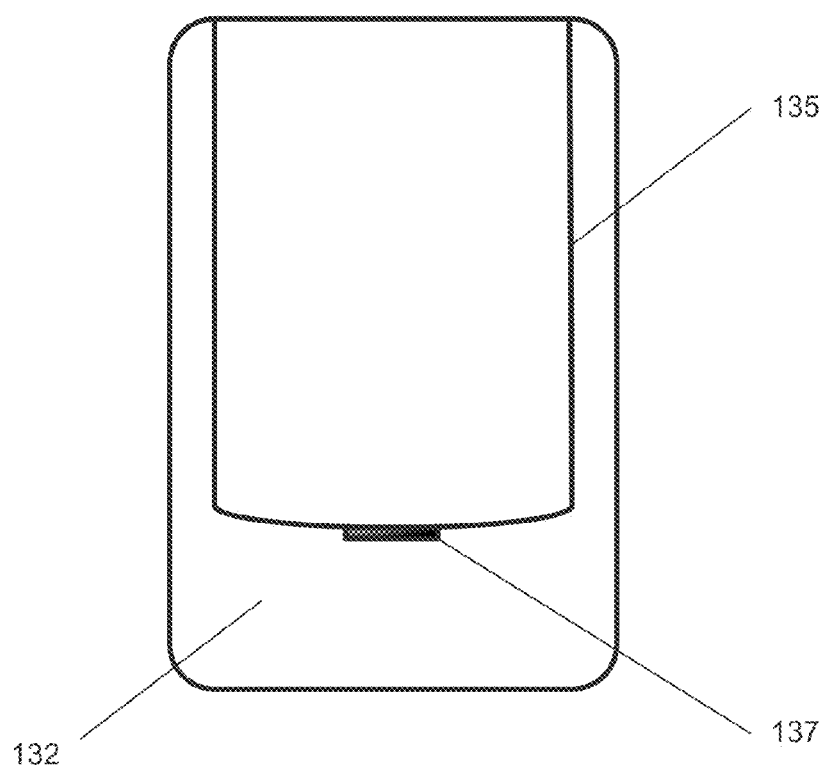

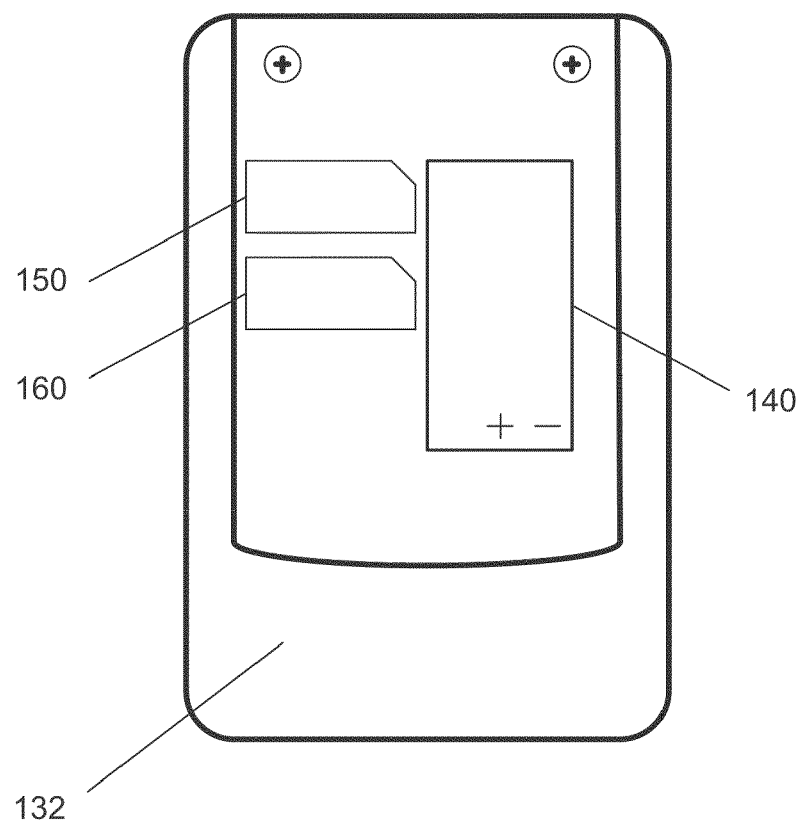

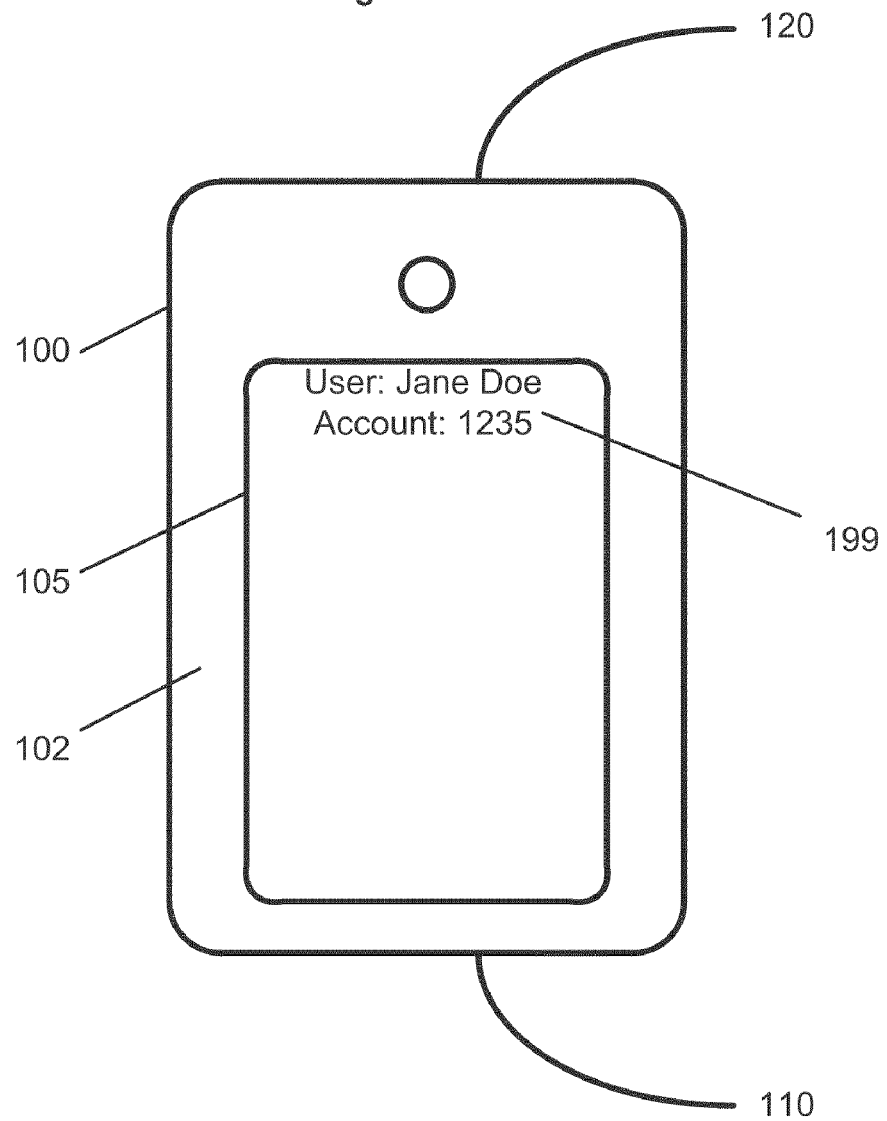

DEVICE ROTATION FOR SIM SELECTION

BACKGROUND

Mobile communications devices, such as cellular telephones, laptop computers, personal digital assistants, and the like, have become an important part of modern life. Furthermore, cellular telephone usage has proliferated rapidly over the past decade. By some estimates, cellular telephone usage in the United States alone has grown from 34 million users in 1995 to over 200 million in 2005.

Mobile communications devices are becoming more powerful, with features keeping pace with technology development in communications equipment generally. For example, many of today's mobile communications devices contain more than one of the following features: phone service, internet browsing, email service, text messaging, a digital camera, audio recording, video recording, music storage and playback, gaming, interactive gaming, general computing functions, videoconferencing, webcasting, instant messaging, applications created for mobile devices, etc.

The rapid proliferation of cellular telephone usage may cause problems arising from the multiplicity of cellular telephones. For example, households may have multiple cellular telephones (e.g., a cellular telephone for one spouse and another cellular telephone for the other spouse). Furthermore, individuals may have more than one cellular telephone (e.g., a cellular telephone for work and a cellular telephone for personal usage).

Having multiple cellular telephones per household or per person may represent inefficient allocation of time or monetary resources. For example, an individual with multiple cellular telephones may have to pay for each phone. In addition, owning or using more than one cellular telephone may make it difficult to keep track of each phone and increase the risk of misplacing or losing a cellular telephone. If a user could get the same service from one mobile communications device, the user may be able to allocate the user's resources more efficiently.

Cellular telephone users may want the functionality of multiple devices, but cannot afford multiple devices. For example, a user may want one telephone for one use and another telephone for another use. However, the user may only be able to afford one device. In another example, a husband and wife may both want their own phone number, but may not be able to afford two devices.

Thus, there exists a need to provide the functionality of multiple devices in one mobile communications device. Although the present disclosure describes with particular reference and application to mobile communications devices, and in particular to cellular telephones, the claimed embodiments are not intended to be limited to mobile communications devices. The claimed embodiments are equally applicable to any device capable of performing as herein disclosed.

SUMMARY

The disclosed embodiments provide devices and methods for selecting an operating configuration of a mobile communications device according to an orientation of the mobile communications device.

The mobile communications device may have multiple orientations. Each orientation may have a defined range for the device. Each orientation may be associated with a configuration of the mobile communications device. For purposes of explanation, a device with two configurations is illustrated; however, the device is not limited to implementations with only two configurations.

As one example, the mobile communications device may have a first end and a second end. A first orientation may be defined as the state when the first end points more up than down. The first orientation may be associated with a first configuration of the mobile communications device. Thus, when the mobile communications device detects that the device is in the first orientation, the device may select the first configuration as the operating configuration. Likewise, a second orientation may be defined as the state when the when the second end points more up than down. The second orientation may be associated with a second configuration of the mobile communications device. When the mobile communications device detects that the device is in the second orientation, the device may select the second configuration as the operating configuration.

The mobile communications device may comprise multiple SIM cards. Each SIM card may be used to operate the mobile communications device in a different configuration and/or as a separate device. Continuing the example of when the mobile communications device has two configurations, a first SIM card may be associated with the first configuration. Further, the first SIM card may control the mobile communications device when the first configuration is the operating configuration. Likewise, a second SIM card may be associated with the second configuration. Thus, when the second configuration is the operating configuration, the second SIM card may control the mobile communications device.

BRIEF DESCRIPTION OF THE DRAWINGS

The foregoing summary, as well as the following detailed description, is better understood when read in conjunction with the drawings. For the purpose of illustrating the claimed subject matter, there is shown in the drawings examples that illustrate various embodiments; however, the invention is not limited to the illustrated embodiments.

FIG. 1A illustrates an exemplary mobile communications device.

FIG. 1B illustrates another view of the exemplary mobile communications device.

FIG. 1C illustrates some components located within the exemplary mobile communications device.

FIG. 1F illustrates another example of how a video display may indicate an operating configuration of a mobile communications device.

DETAILED DESCRIPTION

Figure 1D:
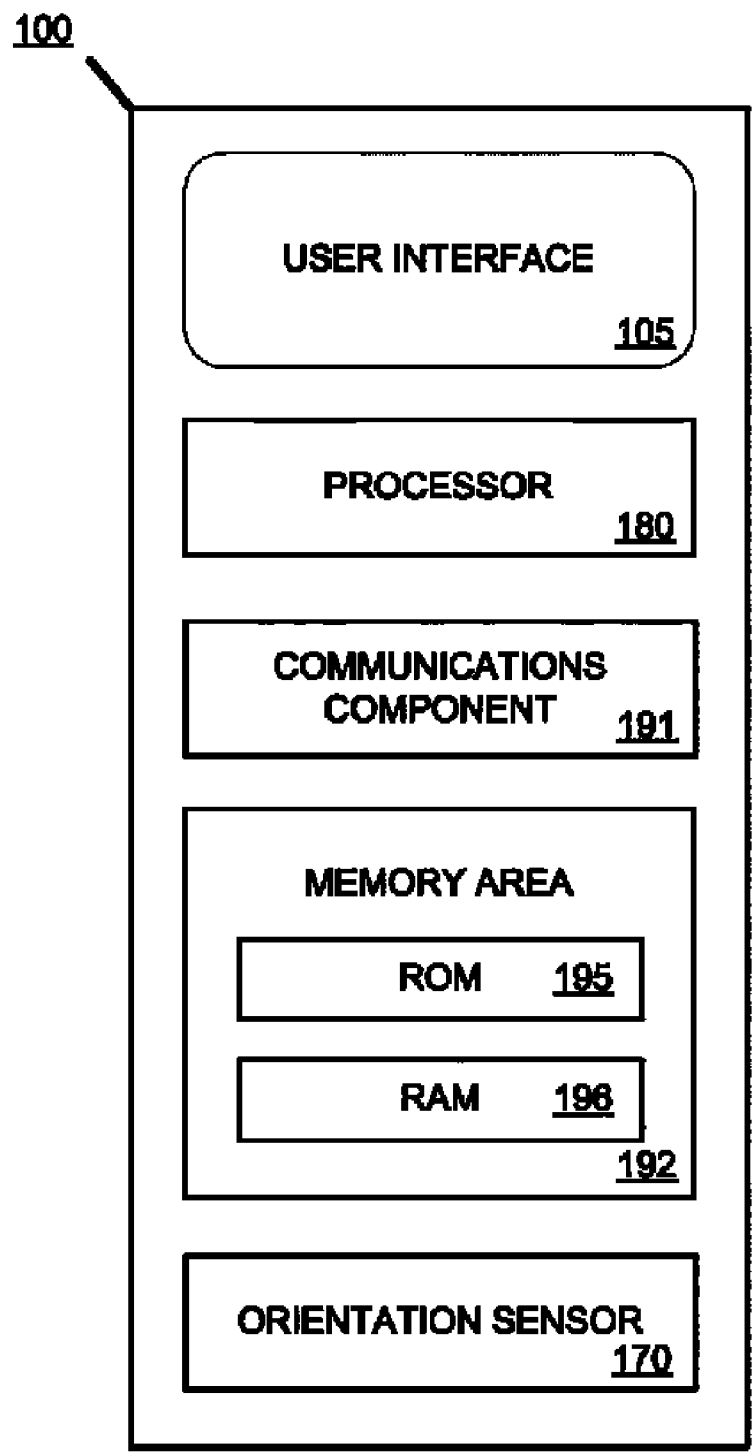
FIG. 1D illustrates further aspects of the exemplary mobile communications device in schematic form.

The detailed description that follows may refer to steps (i.e., portions of a method). However, the disclosed steps and associated methods are exemplary. The order of the steps may be varied where appropriate. In addition, steps may be omitted if not needed and additional steps may be added where appropriate.

The present disclosure describes with particular reference and application to mobile communications devices, and in particular to cellular telephones; however, the claimed embodiments are not intended to be limited to mobile communications devices or cellular telephones. The claimed embodiments are equally applicable to any device capable of performing according to the claims.

FIG. 1A illustrates an exemplary cellular telephone 100. Cellular telephone 100 may comprise first side 102, user interface 105, first end 110, first end pattern 111, second end 120 and second end pattern 121. FIG. 1A illustrates cellular telephone 100 looking down on first side 102, as well as showing a heads on view of first end 110 and second end 120.

User interface 105 may be an interactive touch-screen video display. A user may control features of cellular telephone 100 by touching user interface 105. For example, a user may control such features as accessing email, browsing the internet, playing music, initiating/receiving phone calls, text messaging, playing games, etc.

Cellular Telephone 100 may have two distinct ends, first end 110 and second end 120. The ends may be distinct for ease of use as described herein; however, distinct ends are not required. Further, ends are not required at all.

First end 110 and second end 120 may have patterns and/or textures as an aid to help users identify the ends, such as first end pattern 111 and second end pattern 121. Thus, a user may detect first end pattern 111 and second end pattern 121 visually and/or by touch.

Cellular telephone 100 may also comprise multiple memory/control cards such as SIM cards, R-UIM cards, UICC cards, smart cards, or the like. Although the following discussion describes with particularity the use of cellular telephone 100 with SIM cards, the methods described herein are not limited to use with SIM cards or any specific hardware circuit or device, as the functions disclosed herein may be supported by a variety of hardware and/or software.

FIG. 1B illustrates exemplary cellular telephone 100 looking down on second side 132, which is the side brought into view when cellular telephone 100 is rotated 180 degrees about the longitudinal axis from the position illustrated in FIG. 1A. FIB. 1B illustrates that cellular telephone 100 may also comprise an access panel 135.

Access panel 135 may be removed to gain access to interior components of cellular telephone 100. For example, access panel 135 may be removed by pressing access panel button 137.

FIG. 1C illustrates cellular telephone 100 looking down on second side 132 with access panel 135 removed. FIG. 1C illustrates that cellular telephone 100 may also comprise battery 140, first SIM card 150 and second SIM card 160.

Cellular telephone 100 may include multiple SIM cards. For example, cellular telephone 100 may include a first SIM card 150 and a second SIM card 160. Although FIG. 1C illustrates physically distinct SIM cards, using physically distinct SIM cards is not required. For example, first SIM card 150 and second SIM card 160 may be logically distinct SIM cards.

A SIM card may hold personal identity information, which may identify the user of cellular telephone 100 to a provider of services. For example, if a user attempts to use cellular telephone 100 for services such as phone service or broadband service, a SIM card allows the provider to identify the user and associate provided services with an account the user may have with the provider. For example, the provider may bill the account associated with the user after providing services. In addition, a SIM card may hold other personal information, such as address books, bookmarks, internet preferences, ringtone preferences, memory files, applications, music files, as well as other settings for the device using the SIM card, etc.

First SIM card 150 and second SIM card 160 may be used to operate cellular telephone 100 in two separate configurations, which may include operating cellular telephone 100 as two logically distinct devices. For example, a user may operate cellular telephone 100 as a device associated with the account/settings associated with first SIM card 150. When the device is associated with the account/settings associated with first SIM card 150, the device may be configured for use in a first configuration. Thus, when cellular telephone 100 is in the first configuration, cellular telephone 100 will initiate actions from the account/provider associated with first SIM card 150 (e.g., initiating phone calls, accessing the internet, etc.). Likewise, a user may operate cellular telephone 100 as a device associated with the account/settings associated with second SIM card 160, cellular telephone 100 thus being configured for use in a second configuration.

FIG. 1D illustrates aspects of cellular telephone 100 in schematic form. In addition to the components already described in FIGS. 1A-1C, cellular telephone 100 may also comprise processor 180, wireless communications component 191, a memory area 192 with ROM 195 and RAM 196 and/or orientation sensor 170.

The processor 180 may include any hardware and/or software necessary for operating and/or controlling the user interface 105, the wireless communications component 191, and the memory area 192. For example, the processor 180 may be individual digital logic components, a processor, a microprocessor, an application-specific integrated circuit (ASIC), and the like. The processor 180 may have its own memory such as random access memory (RAM), register memory, cache memory, and the like.

The processor 180 may be in communication with and/or in control of the user interface 105, the wireless communications component 191, and/or the memory area 192. For example, the processor 180 may direct the user interface 105 to receive input from the user, present content, transmit or receive data via the wireless communications component 191, etc.

The processor 180 may operate on computer-executable instructions. Computer-executable instructions may include computer-readable instructions, for example machine code, byte code, script language, runtime code, and the like. The computer-executable instructions, when executed by the processor 180, may for example cause the processor 180 to perform the functions and method herein described.

The user interface 105 may be, in any combination of hardware and/or software, any component, system and/or subsystem for receiving input from a user and/or outputting information to the user. The user interface 105 may include a display, a number pad, or a keyboard or their equivalents. For example, the user interface 105 may include a touch screen to implement such functions. Also, such functions may be implemented mechanically.

The wireless communications component 191 may be, in any combination of hardware and/or software, any component, system, and/or subsystem for providing wireless communications to or from the device. The wireless communications component 191 may provide a wireless communications channel between wireless devices. The wireless communications component 191 may provide point-to-point wireless communications between cellular telephone 100 and a peer device. For example, the wireless communications component 191 may communicate in accordance with the BLUETOOTH® protocol, such as BLUETOOTH® 1.0, BLUETOOTH® 1.0B, BLUETOOTH® 1.1, BLUETOOTH® 1.2, BLUETOOTH® 2.0, BLUETOOTH® 2.0+Enhanced Data Rate (EDR), BLUETOOTH® 2.1+EDR, Institute of Electrical and Electronics Engineers, Inc. (IEEE) specification 802.15.1, and the like.

Memory area 192 may be any component, system, and/or subsystem suitable for storing data. For example, memory area 192 may include storage media in the form of volatile and/or nonvolatile memory such as read only memory (ROM) 195 and random access memory (RAM) 196. A basic input/output system (BIOS), containing basic routines that help to transfer information between components within cellular telephone 100, such as during start-up, is typically stored in ROM 195. RAM 196 typically contains data and/or application modules that are immediately accessible to and/or presently being operated on by processor 180.

Cellular telephone 100 may also include other removable/non-removable, volatile/nonvolatile storage media that can be used as part of memory area 192, for example hard disk drives, optical disc drives, flash memory cards, and the like. The storage media discussed above provide for storage of computer-readable instructions, data structures, program modules and other data for the cellular telephone 100, which may be executed on processor 180.

Processor 180 may select an operating configuration of cellular phone 100 based upon orientation of cellular phone 100. For example, when cellular telephone 100 is oriented in a first manner, operations may be controlled in accordance with first SIM card 150. That is, the operating configuration may allow actions to be initiated in accordance with first SIM card 150, but not second SIM card 160. Likewise, when cellular telephone 100 is oriented in a second manner, operations may be controlled in accordance with second SIM card 160. When oriented in the second manner, the operating configuration may allow actions to take place in accordance with second SIM card 160, but not first SIM card 150.

Cellular telephone 100 may also comprise orientation sensor 170. Orientation sensor 170 may detect how cellular telephone 100 is positioned. For example, orientation sensor 170 may detect how cellular telephone 100 is positioned relative to the ground, indicating whether first end 110 or second end 120 is pointed towards the ground.

Orientation sensor 170 may use any method to detect orientation. For example, orientation sensor 170 may be comprised of one or more of the following: tilt sensor(s), light sensor(s), camera detection, etc. For example, a tilt sensor may indicate orientation relative to the ground or other arbitrarily chosen reference, while light sensors may indicate that an end pointed towards the ground/floor gets less light than an end pointed away from the ground/floor. Further, a camera may be used to detect orientation.

Figure 3A:
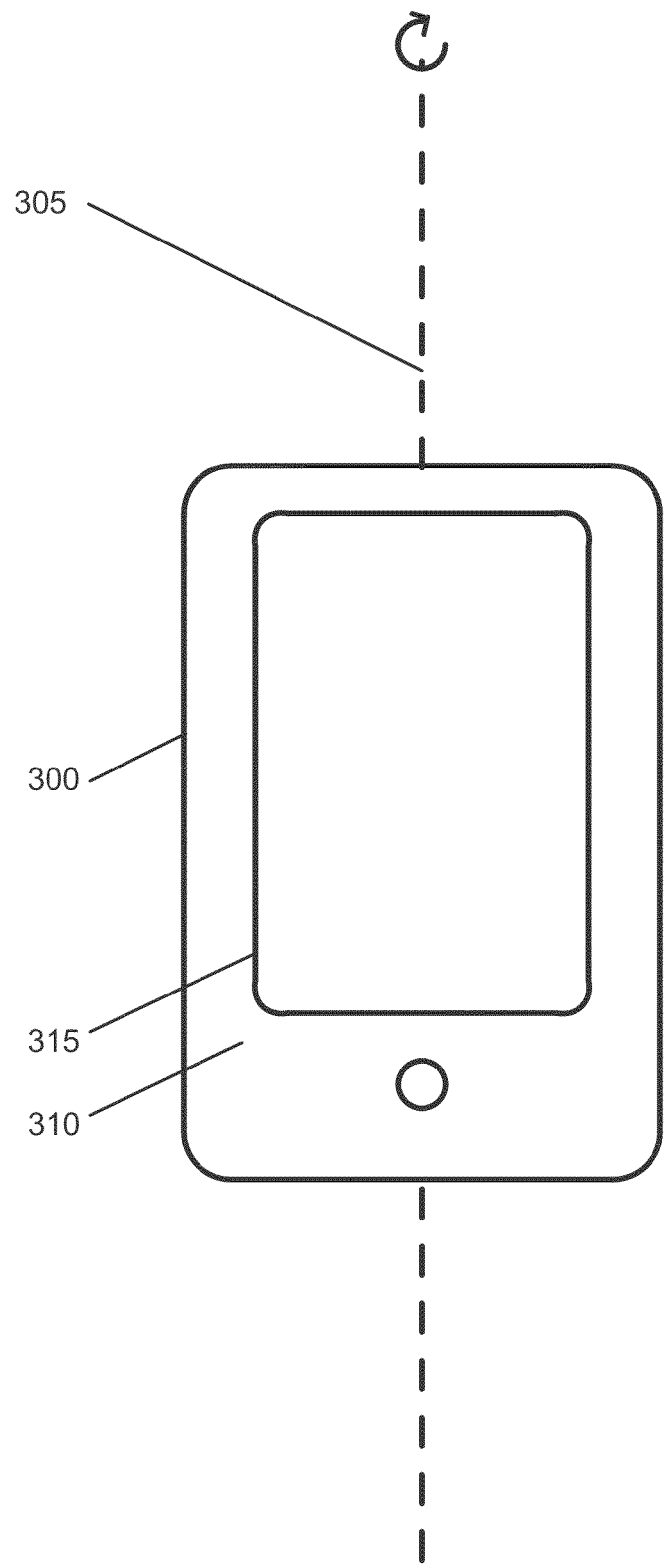
FIG. 3A illustrates another method to determine an orientation of a mobile communications device.

Cellular telephone 100 may use information from orientation sensor 170 in order to select/enable an operating configuration for cellular telephone 100. For example, when cellular telephone 100 is oriented so that first end 110 is pointed towards the sky/ceiling, device operates in accordance with first SIM card 150. Further when cellular telephone 100 is oriented so that second end 120 is pointed towards the sky/ceiling, device may operate in accordance with second SIM card 160. The foregoing examples are matters of design choice. Irrespective of the design choice, the orientation of cellular telephone 100 may be used to choose an operating configuration of cellular telephone 100. FIGS. 3 and 4 illustrate further ways to determine orientation and to use such a determination to configure and operate cellular telephone 100.

Cellular Telephone 100 may manipulate user interface 105 to indicate an operating configuration instead of, or in addition to, having two distinct ends. For example, in the case that user interface 105 is a video display monitor, the user interface 105 may indicate the operating configuration by video means. Such video means may comprise any appropriate video display that may indicate to a user the operating configuration, including without limitation displaying bars of different colors, displaying a user name to indicate an operating configuration, displaying an account number to indicate an operating configuration, etc.

Figure 1E:
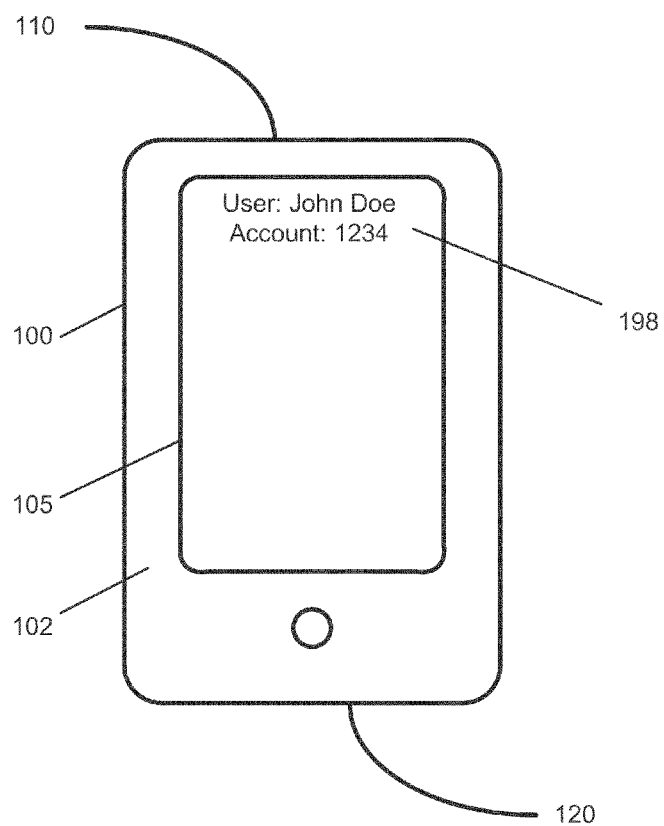
FIG. 1E illustrates how a video display may indicate an operating configuration of a mobile communications device.

FIGS. 1E and 1F illustrate how a video display may be used to indicate the operating configuration. In FIG. 1E, cellular telephone 100 is positioned so that first end 110 is pointed towards the sky/ceiling. Following the example of FIGS. 1A-1D, the device may thus operate in accordance with first SIM card 150, which may be associated with John Doe, who may share cellular telephone 100 with wife, Jane Doe. Processor 180 configures user interface 105 to align with first end 110 pointing towards the sky and indicate John Doe as the user because the operating configuration is associated with the first end 110 pointing towards the sky and the user being John Doe. For example, processor 180 may display first configuration indicator 198. First configuration indicator 198 may be a display showing the user name and account associated with the operating configuration. As can be seen in FIG. 1E, first configuration indicator 198 orients text on the video screen display with proper alignment assuming the user is also oriented in a heads-up position.

Similarly, FIG. 1F illustrates how a video display may be used to indicate a second operating configuration. In FIG. 1F, cellular telephone 100 is positioned so that second end 120 is pointed towards the sky/ceiling. Following the example of FIGS. 1A-1D, the device may thus operate in accordance with second SIM card 160, which may be associated with Jane Doe, the wife of John Doe. Processor 180 configures user interface 105 to align with second end 120 pointing towards the sky and indicating Jane Doe as the user because the operating configuration is associated with the second end 120 pointing towards the sky and the user being Jane Doe. For example, processor 180 may display second configuration indicator 199. Second configuration indicator 199 may be a display showing the user name and account associated with the operating configuration. As can be seen in FIG. 1F, second configuration indicator 199 orients text on the video screen display with proper alignment assuming the user is also oriented in a heads-up position, even though the device has been rotated 180 degrees.

Figure 2A:
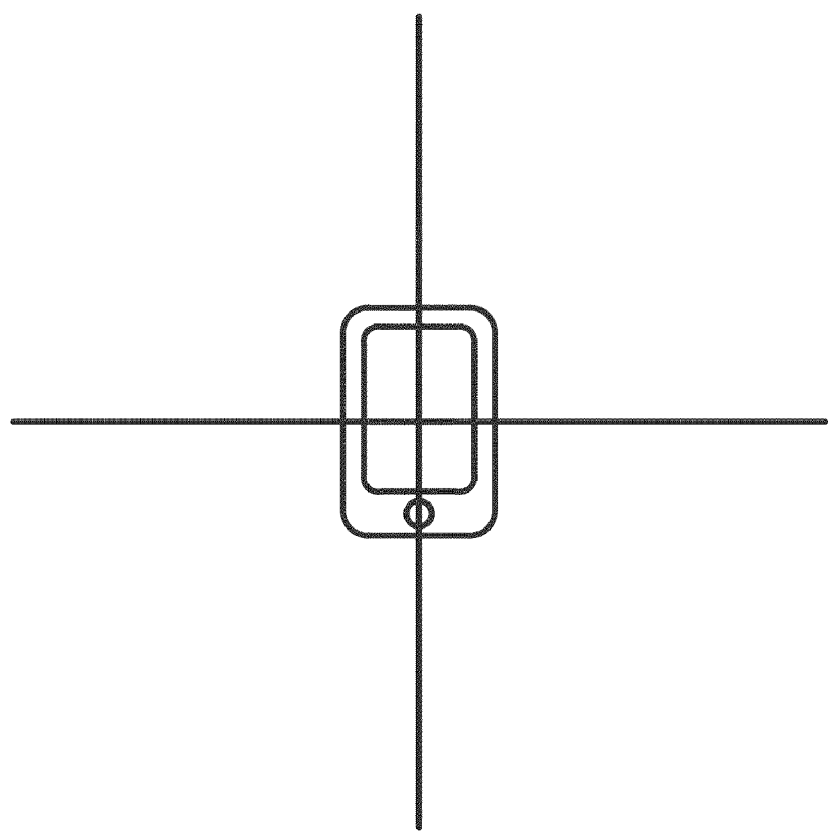
FIG. 2A illustrates an exemplary reference system to determine an orientation of a mobile communications device.

FIG. 2A-2D illustrate exemplary methods to determine an orientation of cellular telephone 100. FIG. 2A illustrates cellular telephone 100 aligned with the y-axis 205 of an x-y coordinate system 200, with first end 110 pointing in the positive y direction and second end 120 pointing in the negative y direction. The x-axis 215 may be considered the floor, or ground, as the case may be, with physical orientation being illustrated by people 220.

The x-y coordinate system 200 may be used to help illustrate defining and selecting operating configurations. As explained above with reference to FIG. 1, device may be operated in two configurations. The device may interpret user intent by determining position/orientation of device. As one example, device may interpret that when first end 110 is pointed up more than down, that the first configuration should be selected as the operating configuration. Likewise, when second end 120 is pointed up more than down, device may select the second configuration as the operating configuration.

Figure 2B:
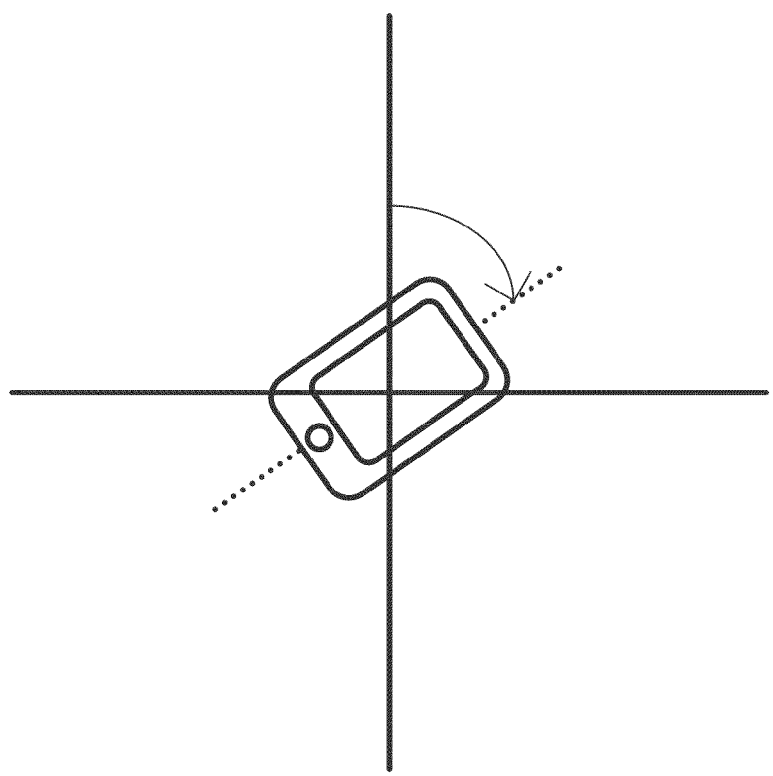
FIG. 2B-2D further illustrate using the exemplary reference system of FIG. 2A to determine an orientation of a mobile communications device.
Figure 2C:
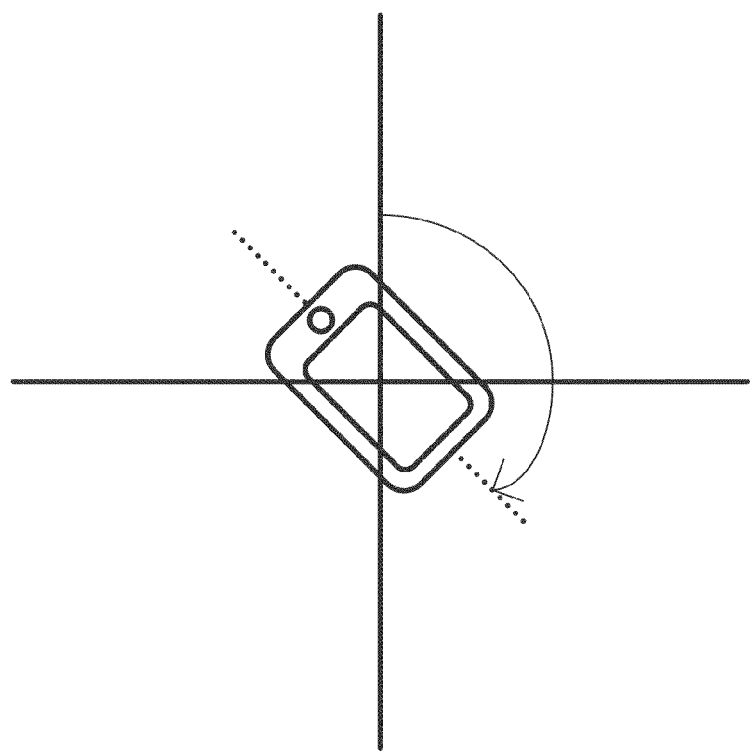
Figure 2D:
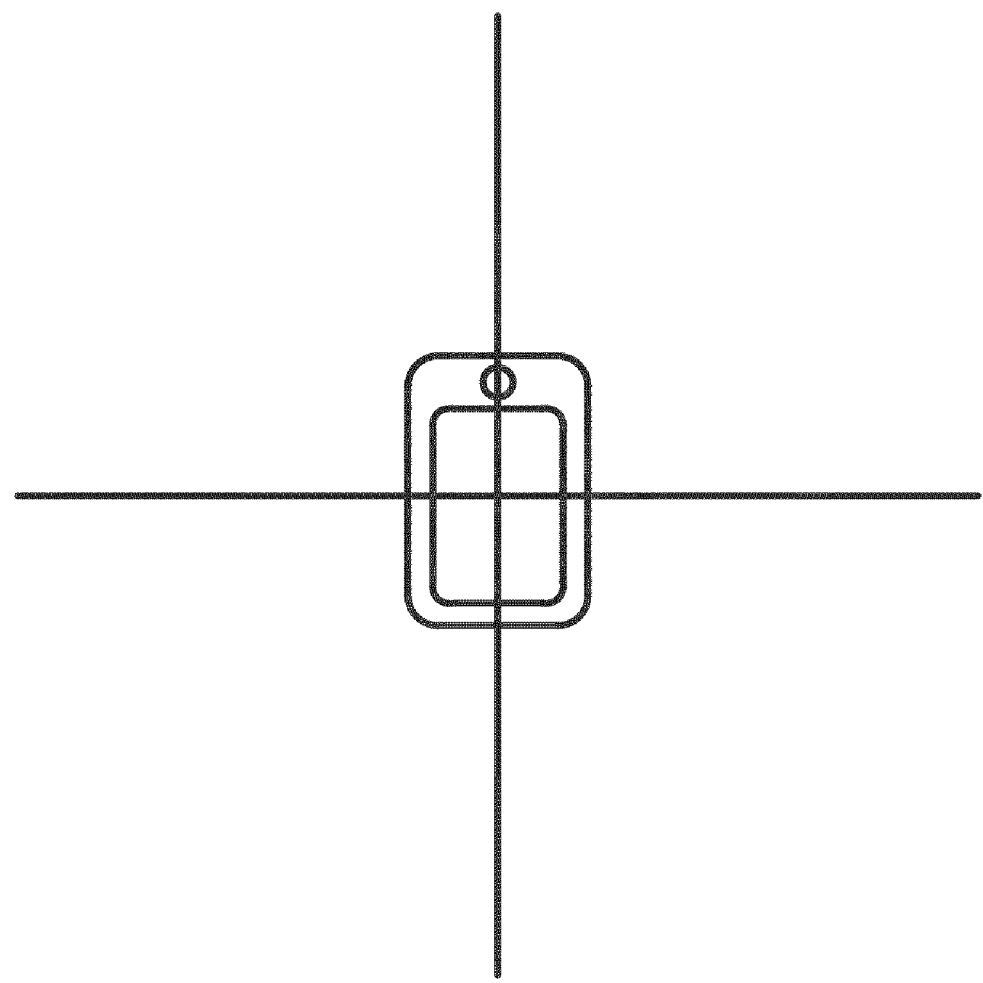

These examples may be explained by referring to FIG. 2A-2D. The alignment pictured in FIG. 2A may be referred to as the reference alignment, whereby any deviations from the reference position are measured as an angle from the reference alignment. Thus, in the reference alignment of FIG. 2A, the position of the device is 0 degrees. As another example, FIG. 2B illustrates device rotated in a clockwise direction. The position of device in FIG. 2B is 45 degrees. FIG. 2C illustrates another position of device. In FIG. 2C the position of device is 135 degrees. As a final example, FIG. 2D illustrates device where second end 120 now points toward to the positive y-axis and first end 110 points toward to the negative y-axis. As shown in FIG. 2D, the position of device may be referred to as located at 180 degrees. Device may be positioned anywhere along the 0 to 360 degree continuum.

Again referring to the x-axis 215 as the ground, it may be appreciated that when device is positioned so that angle of cellular telephone 200, $\theta$, has the range of values $270<\theta<360$ or $0<\theta<90$, first end 110 points more up than down. When first end 110 points more up than down, the orientation of the device may be in a first orientation. When cellular telephone 200 is in the first orientation, processor 180 may configure cellular telephone 200 to a first operating configuration. Said in a different way, cellular telephone 200 may assume that it is the intent of a user to operate cellular telephone 200 in the first operating configuration when cellular telephone 200 is in the first orientation.

It may also be appreciated that when device is positioned so that angle of cellular telephone 200, $\theta$, has the range of values $90<\theta<270$, second end 120 points more up than down. When second end 120 points more up than down, the orientation of the device may be in a second orientation. When cellular telephone 200 is in the second orientation, processor 180 may configure cellular telephone 200 to a second operating configuration.

The same reasoning that applies to the two dimensional x-y axis 205 may be applied to three dimensional systems.

FIGS. 1 and 2 describe one way of using position to configure cellular telephone 200. The examples described in FIGS. 1 and 2 are not meant to limit the claimed embodiments. Any way of orienting a device may be used to choose an operating configuration of the device.

FIGS. 1 and 2 illustrate using the ends of cellular telephone 200 as reference points in defining orientation as well as for configuring cellular telephone 200 in response to detected orientations. FIG. 3A illustrates another example of how to use position to configure a device.

FIG. 3A illustrates cellular telephone 300 as well as the longitudinal axis 305 of cellular telephone 300. Cellular telephone 300 may comprise first face 310, first user interface 315, second face 320 (not pictured), and second user interface 325 (not pictured).

Instead of using the ends of the device as a reference, the faces of cellular telephone 300 may be used in helping a user orient cellular telephone 300. As with the ends in the example of FIG. 1, cellular telephone 300 may also have patterns or textures to aid in identification, however the patterns may be placed on the faces.

For example, cellular telephone 300 may have one pattern and/or texture on first face 310 and another pattern and/or texture on second face 320. Although cellular telephone 300 may include different face patterns and/or textures for ease of use, face patterns are not required.

Figure 3B:
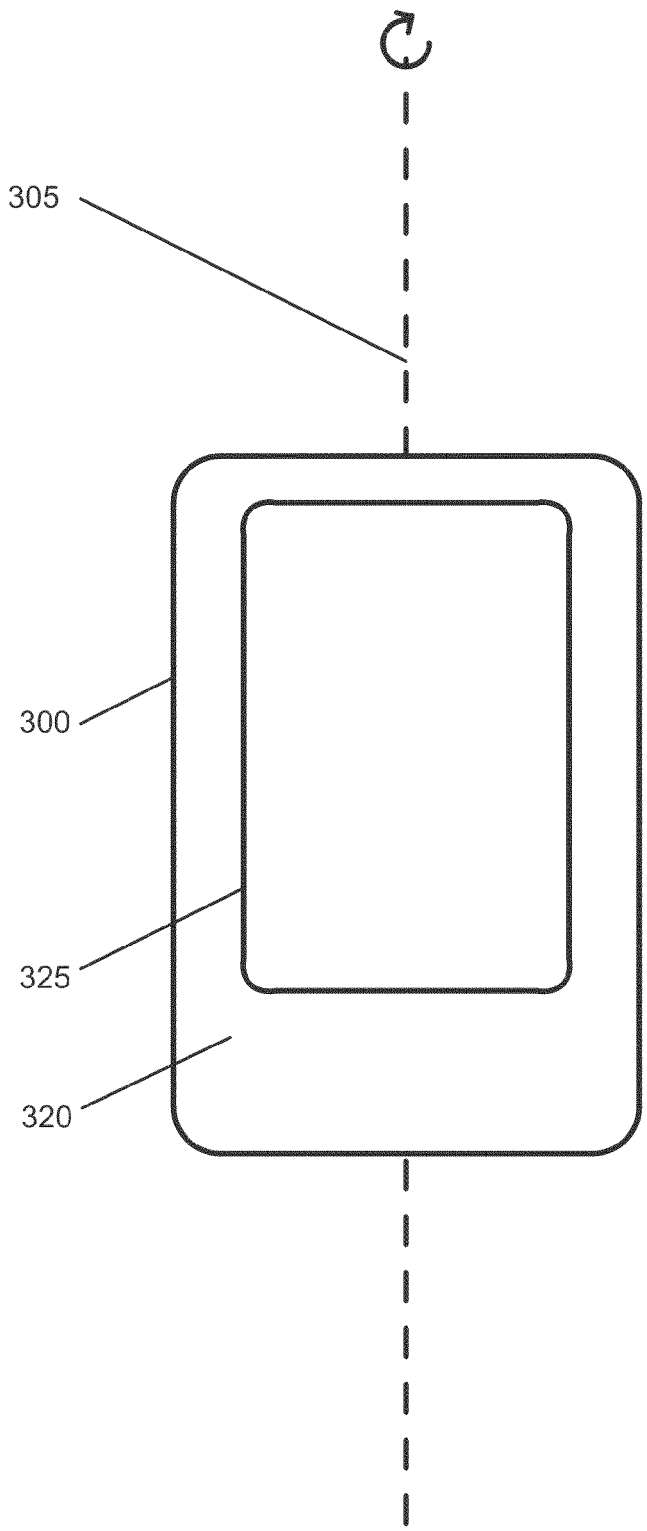
FIG. 3B further illustrates the method of FIG. 3A to determine an orientation of a mobile communications device.
Figure 4:
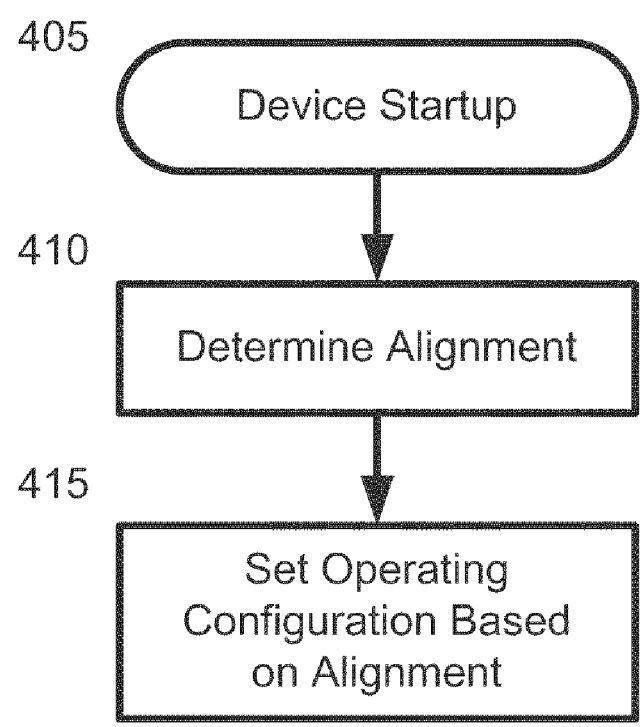
FIG. 4 illustrates an exemplary method to determine orientation and set an operating configuration of a mobile communications device.

FIG. 3B illustrates cellular telephone 300 rotated 180 degrees about longitudinal axis 305. Second face 320 is pictured in FIG. 3B. Cellular telephone 300 may have a second user interface 325 as pictured in FIG. 3B. For example, cellular telephone 300 may implement first user interface 315 and second user interface 325 using two interactive touch-screen video displays. The two interactive touch-screen video displays may be implemented with separate displays, a two sided screen, etc.

As another example, cellular telephone 300 may provide a user interface available for use in all configurations. For example, cellular telephone 300 may implement first user interface 315 and second user interface 325 using an interactive touch-screen video display that may be mechanically shifted to align with the orientation of cellular telephone 300.

The surfaces of cellular telephone 300 may be used as references in the same manner as the ends were used in the example of FIGS. 1 and 2. For example, when first face 310 faces more up than down, the orientation of the device may be in a first orientation. When cellular telephone 300 is in the first orientation, processor 180 may configure cellular telephone 300 to a first operating configuration. Said in a different way, cellular telephone 300 may assume that it is the intent of a user to operate cellular telephone 300 in the first operating configuration when cellular telephone 300 is in the first orientation.

It may also be appreciated that when second face 320 points more up than down the orientation of the device may be in a second orientation. When cellular telephone 300 is in the second orientation, processor 180 may configure cellular telephone 300 to a second operating configuration.

FIG. 4 illustrates an exemplary method to set an operating configuration of cellular telephone 100. At 405 device start-up occurs. That is, device is powered up and initializes. At 410, device determines alignment. Device may determine alignment by any method, including the methods discussed in relation to FIGS. 1-3.

At 415, processor may set the operating configuration of device based upon orientation of cellular telephone 100. Using FIGS. 1 and 2 as an example, first end 110 is associated with a first configuration of device and second end 120 is associated with a second configuration of device. Still following the example of FIGS. 1 and 2, if first end 110 is pointed up more than down, then processor may set the first configuration as the operating configuration of device.

By setting an operating configuration, processor enables actions associated with that operating configuration. For example, if processor sets the first configuration as the operating configuration, calls may be made from the number associated with the first configuration, but calls may not be able to be made from the number associated with the second configuration.

Figure 5:
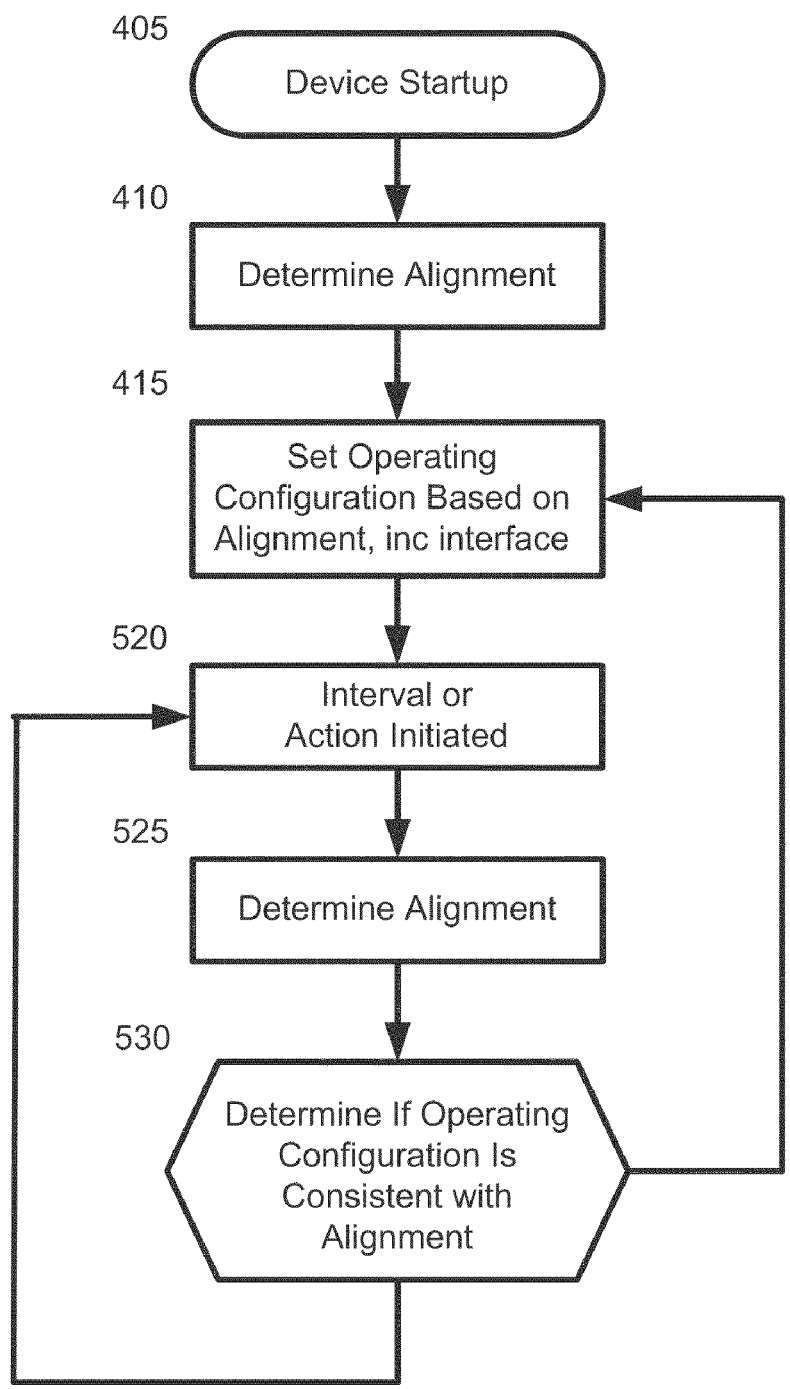
FIG. 5 illustrates an exemplary method to monitor orientation of a mobile communications device in order to keep the operating configuration consistent with user intent.

Processor may monitor alignment of device to ensure that the operating configuration is consistent with alignment of device. FIG. 5 illustrates an exemplary method to monitor orientation, and if necessary, change the operating configuration of device.

At 520, some time may have elapsed since the operating configuration was set at 415. Also, an action may have been initiated, such as initiating a phone call, email or internet action. At 525, processor may determine alignment. For example, processor may monitor or sample data from alignment sensor 170. At 530, processor may determine if the operating configuration is consistent with the alignment of device, including the configuration of user interface 105. If the operating configuration is consistent with the alignment of device, then method may return to 520. If the operating configuration is not consistent with the alignment of device, the method may continue at 415 where processor may change the operating configuration to be consistent with the alignment of device.

Protection may be provided for cellular phone operations. For example, a processor, or associated hardware or software, may ensure that a change in orientation does not interfere with cellular phone operations. For example, if a phone call is initiated while a cellular phone is in a first operating configuration, the processor may ensure that the phone call will not be interrupted by a change in orientation. Further, actions that may normally take place during a phone call will continue to be enabled. A processor may also maintain the orientation of the display to be consistent with the configuration from which the phone call was first produced.

A processor may also allow actions for configurations that are not enabled. For example, although one configuration may be enabled, a cellular phone may still receive email for other configurations that are not enabled. As another example, a cellular phone may receive a phone call for a non-enabled configuration. In such a case, the cellular phone may ring indicating an incoming call on the non-enabled configuration, allowing a user to reorient the cellular phone to initiate reception of the call. The cellular phone may also simply send the incoming call to the non-enabled configuration to a voicemail system. The cellular phone may use a distinct ringtone to indicate an incoming call on a non-enabled configuration.

A processor may continue to process actions associated with an enabled configuration even after changing operating configurations. For example, a user of an operating configuration may initiate a download, such as a download of a song for example. A user may then change the orientation of the cellular phone. In response to the change in orientation, a processor may enable a different configuration. Although the configuration from which the song download was initiated is no longer the operating configuration, the cellular phone may continue the download until complete. Further, a processor may allow actions to be taken in the new operating configuration that do not interfere with the download.

A cellular phone may process tasks for multiple configurations. For example, a user may make a first call from an operating configuration. During the first call a second call may come in on one of the non-operating configurations. The cellular phone may be configured to allow the user to place the first call on hold and answer the second call. The cellular phone may be configured to allow the user to answer the second call in such ways as reorienting the phone and using the operating configuration used to make the first call.

A cellular phone may be configured to allow a user to lock the cellular phone in an operating configuration. For example, a user may be able to enter information via the user interface or by pressing a mechanical button that will keep the cellular phone in the current operating configuration (i.e., the operating configuration that the cellular phone was in when the user locked the cellular phone).

A mobile communications device may provide password protection to protect a configuration from being used when the account holder associated with the configuration does not want that configuration used. For example, consider when a cellular phone is used as a personal and work device. In such a case, a user may not want to pay for a work phone call that was placed on a personal account number. However, if a work call was placed from the user's personal account, a user may have to pay the cost of the call from the personal account. By prompting for a password, a cellular phone may help protect a user from initiating actions from the wrong account.

In another case, consider that an account associated with one configuration has unlimited text messaging, while other configurations are associated with accounts that charge for text messaging on a per use basis. An account holder/user may desire that all text messages from the cellular phone are associated with the account that has an unlimited texting plan. Again, by prompting for a password, the cellular phone may help protect users from initiating actions from the wrong account.

In another case, there may be multiple users of a cellular phone with multiple accounts. For example, a company may provide a mobile communications device for use by three people to cover a full three-shift workday (i.e., a device may be used by an employee on the first shift, an employee on the second shift and an employee on the third shift). Each of the three employees may be associated with a different account. Further a company may want to track usage of the device by the three employees. By requiring passwords to be entered by each of the three people, the company may be able to track usage by each employee.

Figure 6:
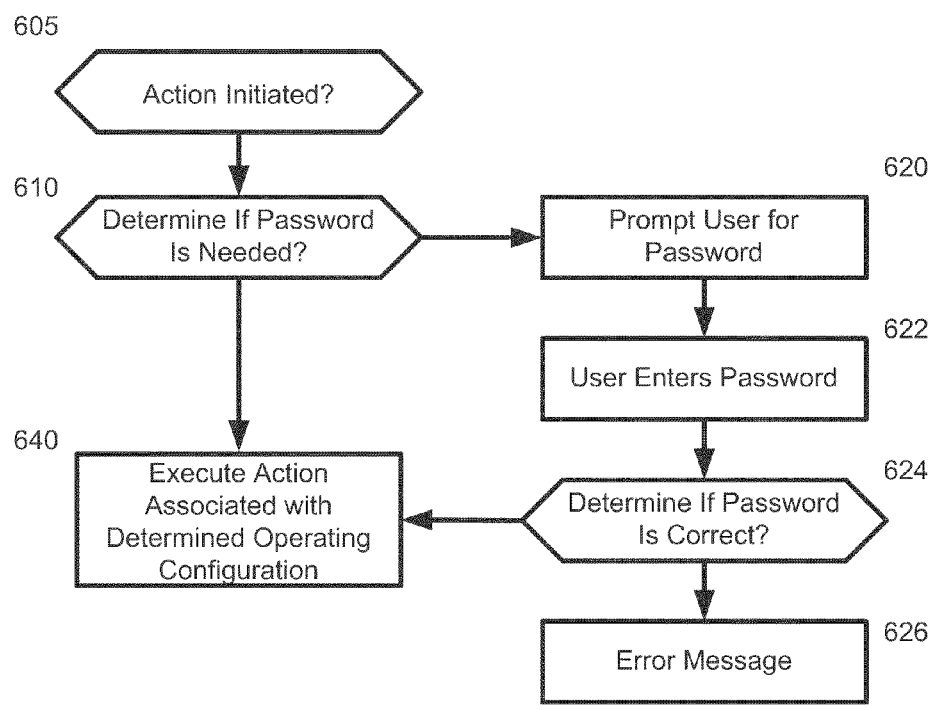
FIG. 6 illustrates an exemplary method to provide password protection to a mobile communications device.

FIG. 6 illustrates an exemplary method to provide password protection to mobile communication devices, including devices such as cellular telephone 100. One or more actions may require entry of a password in order to initiate such action. At 605, an action may be initiated in an operating configuration of cellular telephone 100. At 610, processor may determine whether a password is necessary to execute the action initiated at 605. That is, the mobile communications device may be required to ask for and confirm a password before executing the action initiated at 605.

A password procedure may keep the mobile communications device secure from unauthorized use when the mobile communications device is shared among multiple users or whenever the mobile communications device is out of the control of the authorized user. Further, some actions may be password protected while others are not. For example, a user may indicate that a password is necessary for actions that incur a change to the user's account (e.g. initiating a phone call), but not for actions that do not (e.g. sending a text message from an account that has an unlimited texting plan). If a password is not required, at 640, processor executes the action initiated at 605.

When a password is required, at 620, processor may prompt a user to enter a password. At 622, a user may enter a password. A user may enter a password through user interface 105 or through any appropriate method. At 624, processor may determine if the password entered by the user is correct. If the password entered by the user is correct, the method may continue at 640 by executing the action. If the password entered by the user is incorrect, at 626, processor may cause an error message to be communicated to the user. Alternately, processor may go back to 620 to allow the user to try and enter a correct password.

A user may not want to enter a password each time the user wants to initiate an action. That is, the added security of requiring a password when an action is initiated may be unwanted. Consider the case when only one person is using the mobile communications device; for example, the case when a person uses the mobile communications device so that it may be configured as device for personal use or a device for work use (doesn't want a work call billed to personal). Such a user may not want to enter a password when initiating each action.

Figure 7:
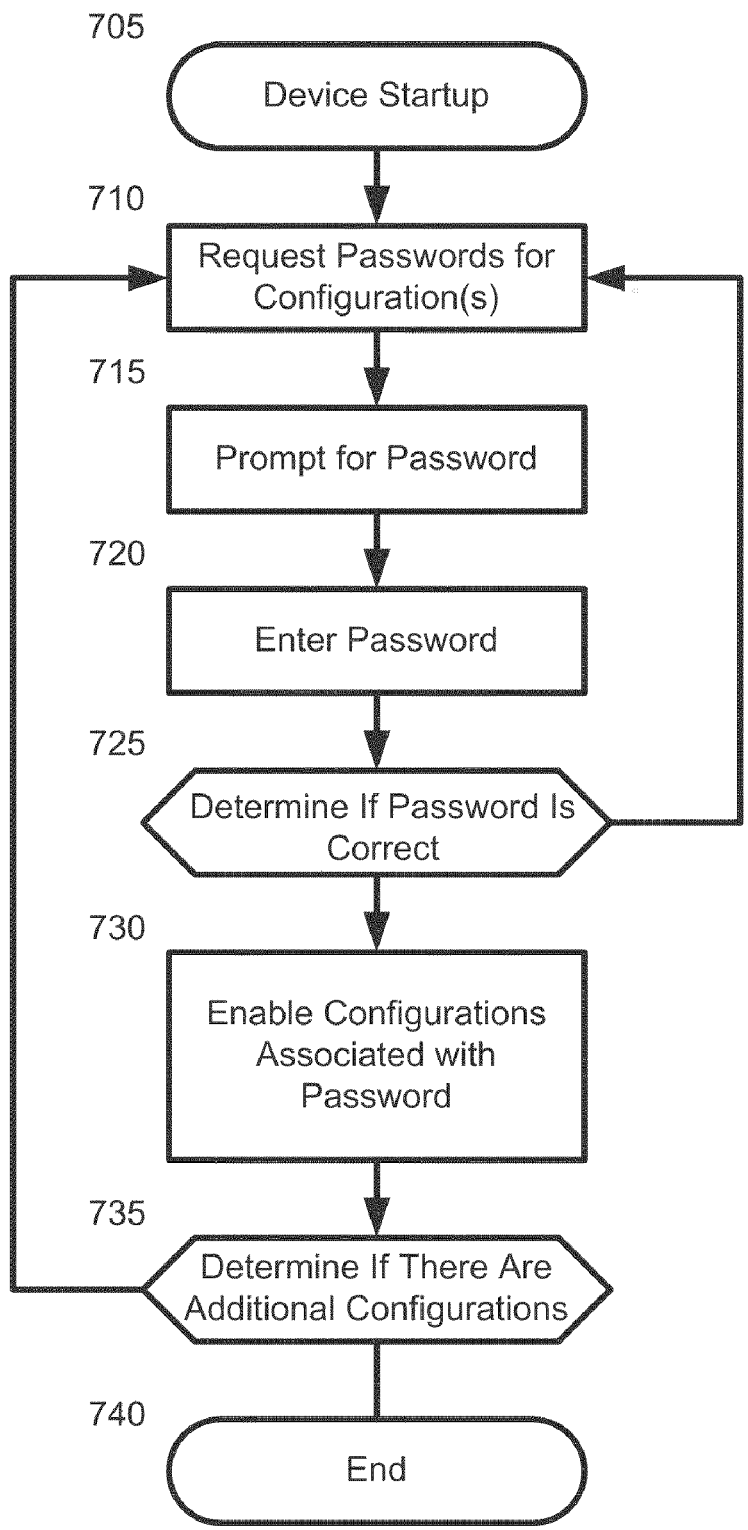
FIG. 7 illustrates another exemplary method to provide password protection to a mobile communications device.

FIG. 7 illustrates an exemplary method to provide password protection to a mobile communications device. At 705, device start-up occurs (i.e., device is powered up). At 710, the mobile communications device requests a password for one or more operating configurations.

There may be a one-to-one correlation between a password and a configuration. In addition, there may be a one-to-many (but not all) correlation between a password and multiple configurations. That is, one password may apply to multiple configurations, but not all configurations. A one-to-many configuration may be appropriate when multiple configurations are associated with one account, while one or more other configurations are not associated with that account. There may also be a one-to-all correlation between a password and all configurations of the mobile communications device. For example, all of the operating configurations of the mobile communications device may be enabled with a single password. Using one password for multiple operating configurations may be appropriate where only one person uses the mobile communications device. Using one password may also be appropriate in other situations, such as when spouses share a phone.

At 715, processor may prompt a user of the one or more configurations to enter a password. At 720, a user may enter a password in response to the prompt. At 725, processor may determine if the password entered by the user is correct. At 730, processor enables operating configurations associated with a correctly entered password. That is, enabling operating configurations may include that when an alignment indicates the enabled configuration, such configuration may be used without the need to provide passwords. If the entered password is not correct, the operating configurations associated with the requested password will not be enabled. The method may repeat at 710, allowing a user to enter a correct password. Steps may be added to limit the number of times a user may attempt to enter a correct password. The method may include processor causing an error message to be communicated to the user.

At 735, processor may determine whether any additional operating configurations require passwords. If additional operating configurations require passwords, the method repeats at 710. Otherwise, the method may end at 740. Under the method described by FIG. 7, a password may only need to be entered once after startup.

Of course another alternative is to forego requiring passwords at all. However, users may find password protection more useful for the mobile communications devices disclosed herein because of the availability of using the devices in multiple configurations and/or by multiple users.

Figure 8:
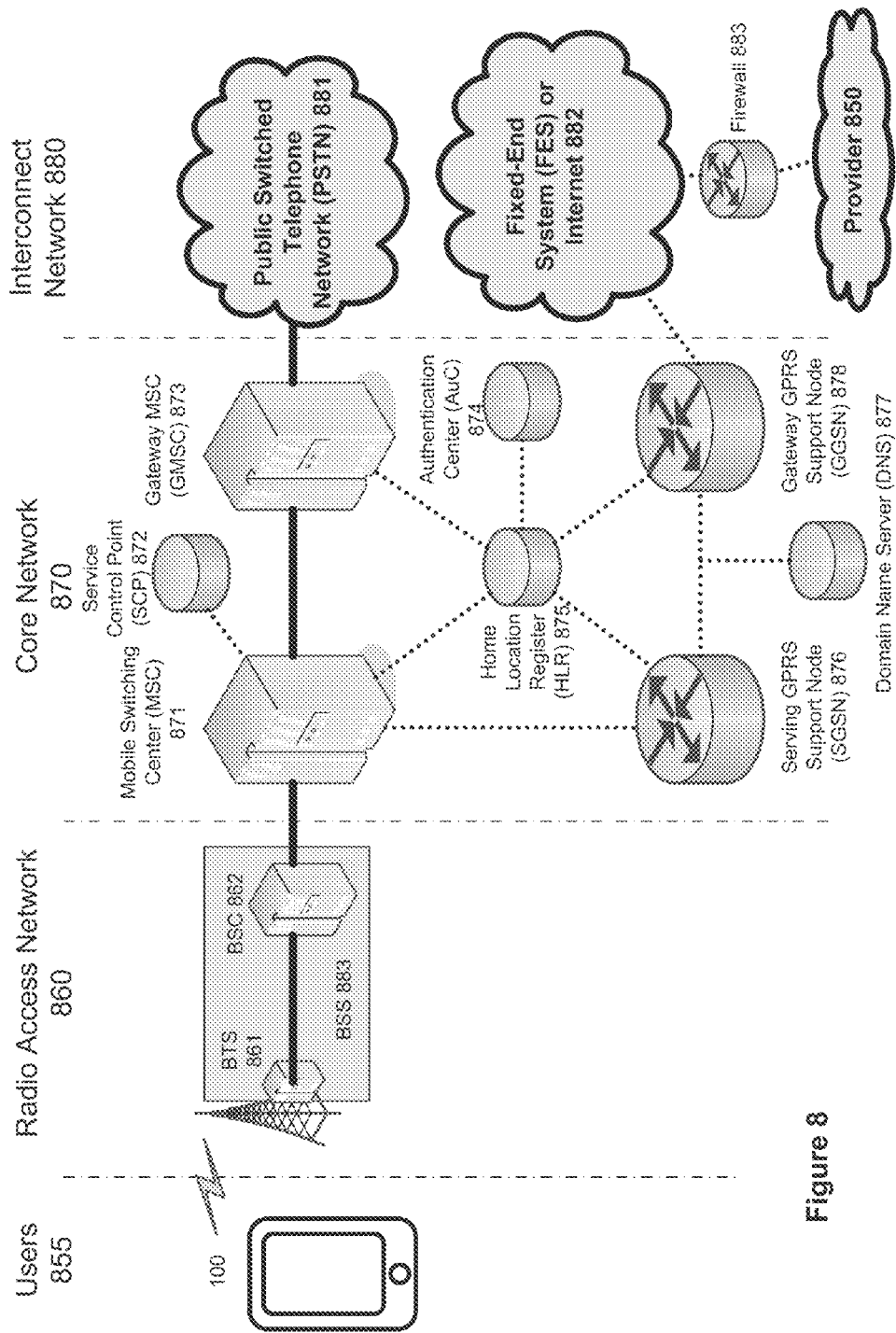
FIG. 8 illustrates an exemplary network environment in which mobile communication devices may be used.

The devices described herein may work in conjunction with communication networks and systems. FIG. 8 illustrates an exemplary network environment in which the devices may be used.

The following information may help in understanding FIG. 8. The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

FIG. 8 illustrates the architecture of a typical GPRS network as segmented into four areas: users 855, radio access network 860, core network 870 and interconnect network 880. Users 855 may include a plurality of end users, as well as other users of the network. The users may employ any type of device capable of communicating with the network, including mobile communications devices, which may include cellular telephone 100. The radio access network 860 may include a plurality of base station subsystems such as the BSSs 863, which include Base Transceiver Stations (BTSs) 861 and Base Station Controllers (BSCs) 862. The core network 870 may include a host of various network elements. As illustrated here, the core network 870 may include a Mobile Switching Center ("MSC") 871, a Service Control Point ("SCP") 872, a gateway MSC 873, a Serving GPRS Support Node (SGSN) 876, a Home Location Register ("HLR") 875, an Authentication Center ("AuC") 874, a Domain Name Server ("DNS") 877 and a Gateway GPRS Support Node (GGSN) 878. The interconnect network area 880 also may include networks and network elements. As illustrated in FIG. 8, the interconnect network 880 may include a Public Switched Telephone Network ("PSTN") 881, a Fixed-End System ("FES") and/or the Internet 882, a firewall 883 and/or provider 850.

A mobile switching center 871 may be connected to a large number of base station controllers. At MSC 871, for example, depending on the type of traffic, the traffic may be separated such that voice may be sent to Public Switched Telephone Network ("PSTN") 881 through Gateway MSC ("GMSC") 873, and/or data may be sent to the SGSN 876, which then sends the data traffic to the GGSN 878 for further forwarding.

When the MSC 871 receives transmission traffic, for example, from the BSC 862, it may send a query to a database hosted by the SCP 872. The SCP 872 may process the request and may issue a response to the MSC 871 so that it may continue processing received transmissions as appropriate.

The HLR 875 may be a centralized database for users to register with the GPRS network. The HLR 875 may store static information about subscribers such as the International Mobile Subscriber Identity ("IMSI"), subscribed services, and/or a key for authenticating subscribers. HLR 875 may authenticate one or more configurations of cellular telephone 100. Thus, HLR 875 may authenticate information contained within first SIM card 150 and second SIM card 160.

The HLR 875 may also store dynamic subscriber information such as the current location of the mobile subscriber. Associated with HLR 875 may be an AuC 874. The AuC 874 may be a database that contains the algorithms for authenticating subscribers and may include the associated keys for encryption to safeguard the user input for authentication.

In the following, depending on context, the term "device subscriber" may refer to either an end user or to an actual device, such as cellular telephone 100. When a device subscriber turns on a device, the device goes through an attach process by which the device attaches to a SGSN of the GPRS network. The attach process may apply to multiple configurations of cellular telephone 100. That is, the network may authenticate each configuration based on information contained in the SIM card associated with a particular configuration. However, as described above, cellular telephone 100 may be configured so that an operating configuration may initiate actions, while other configurations may not be able to initiate actions.

Referring again to FIG. 8, the device subscriber may initiate the attach process by turning on the network capabilities of the device. An attach request may be sent by the device subscriber to the SGSN 876. The SGSN 876 may query another SGSN, to which the device subscriber may have been attached before, for the identity of the device subscriber. Upon receiving the identity of the device subscriber from the other SGSN, the SGSN 876 may request more information from the device subscriber. This information may be used to authenticate the device subscriber to the SGSN 876 by the HLR 875. Once the device subscriber is verified, the SGSN 876 may send a location update to the HLR 875 indicating the change of location to a new SGSN, in this case the SGSN at 830. The HLR 875 may notify the old SGSN, to which the device subscriber was attached, to cancel the location process for the device subscriber. The HLR 875 may then notify the SGSN 876 that the location update has been performed. At this time, the SGSN 876 may send an "Attach Accept" message to the device subscriber, which in turn, may send an "Attach Complete" message to the SGSN 876.

After the attaching process, the device subscriber may enter an authentication process. In the authentication process, the SGSN 876 may send authentication information to the HLR 875, which may send information back to the SGSN 876 based on the user profile that was part of the user's initial setup. The SGSN 876 may then send a request for authentication and ciphering to the device subscriber. The device subscriber may use an algorithm to send the user identification (ID) and/or a password to the SGSN 876. The SGSN 876 may use the same algorithm to compare the result. If a match occurs, the SGSN 876 may authenticate the device subscriber.

Next, the device subscriber may establish a user session with the destination network, the provider 850 for example, by going through a Packet Data Protocol ("PDP") activation process. The device subscriber may request access to the Access Point Name ("APN"), provider.com for example, and the SGSN 876 may receive the activation request from the device subscriber. The SGSN 876 may then initiate a Domain Name Service ("DNS") query to learn which GGSN node has access to the provider.com APN. The DNS query may be sent to the DNS server 877 within the core network 870 which may be provisioned to map to one or more GGSN nodes in the core network 870. Based on the APN, the mapped GGSN 878 may access the requested provider 850. The SGSN 876 may then send to the GGSN 878 a Create Packet Data Protocol ("PDP") Context Request message. The GGSN 878 may send a Create PDP Context Response message to the SGSN 876, which may then send an Activate PDP Context Accept message to the device subscriber.

Once activated, data packets of the transmission made by the device subscriber may then go through radio access network 860, core network 870, and interconnect network 880, to reach provider 850.

What is claimed:

1. A device configured to select an operating configuration of the device in accordance with an orientation of the device, the device comprising:
   at least one sensor configured to sense the orientation of the device; and
   a processing portion configured to:
      determine that the sensed orientation is one of a first orientation and a second orientation; and
      configure the device to an operating configuration associated with the sensed orientation, wherein:
         the device is configured to a first operating configuration when the device is determined to be in the first orientation; and
         the device is configured to a second operating configuration when the device is determined to be in the second orientation; and
   a first Subscriber Identity Module (SIM) card associated with the first operating configuration and a second SIM card associated with the second operating configuration.

2. The device of claim 1 wherein configuring the device to the first operating configuration comprises selecting functions associated with the first SIM card, and wherein configuring the device to the second operating configuration comprises selecting functions associated with the second SIM card.

3. The device of claim 2 wherein the functions include at least one of:
   linking the operating configuration to a billing account, making available an address book associated with the operating configuration, aligning a user interface to match the operating configuration or selecting ringtones associated with the operating configuration.

4. The device of claim 2, wherein the processing portion is further configured to initiate an action associated with the operating configuration.

5. The device of claim 4, wherein the processing portion is further configured to continue the initiated action whether or not the sensed orientation changes.

6. The device of claim 1, wherein the device is further configured to detect an incoming phone call associated with a configuration other than the operating configuration.

7. The device of claim 6, wherein the device is further configured to answer the incoming call in response to one or more of the following: changing the orientation of the device to another orientation associated with the incoming phone call or a user input.

8. The device of claim 1, further comprising a first end having a first pattern and a second end having a second pattern.

9. The device of claim 1, further comprising a video display configured to provide a user interface aligned with the determined orientation of the device.

10. The device of claim 1, wherein the sensed orientation may be one of a plurality of orientations each associated with one of a plurality of configurations, and
wherein the processing portion configures the device to operate according to one configuration associated with the sensed orientation.

11. A device configured to select an operating configuration of the device in accordance with an orientation of the device, the device comprising:
at least one sensor configured to sense the orientation of the device;
a plurality of Subscriber Identity Module (SIM) cards; and
a processing portion configured to:
determine the sensed orientation of the device being one of a plurality of orientations; and
configure the device to an operating configuration associated with the one of the plurality of orientations, wherein the device has a plurality of operating configurations, and wherein the operating configuration is associated with one of the plurality of SIM cards.

12. A method to select an operating configuration of a device according to an orientation of the device, the method comprising:
sensing an orientation of the device;
determining the sensed orientation of the device being one of a first orientation and a second orientation;
configuring the device to an operating configuration associated with the sensed orientation, wherein:
the device is configured to a first operating configuration when the device is determined to be in the first orientation;
the device is configured to a second operating configuration when the device is determined to be in the second orientation; and
the first operating configuration is associated with a first Subscriber Identity Module (SIM) card, and wherein the second operating configuration is associated with a second SIM card.

13. The method of claim 12, wherein configuring the device to the first operating configuration comprises selecting functions associated with the first SIM card, and wherein configuring the device to the second operating configuration comprises selecting functions associated with the second SIM card.

14. The method of claim 13, wherein the functions include at least one of:
linking the operating configuration to a billing account, making available an address book associated with the operating configuration, aligning a user interface to match the operating configuration or selecting ringtones associated with the operating configuration.

15. The method of claim 12, further comprising initiating an action associated with the operating configuration.

16. The method of claim 15, further comprising continuing the initiated action whether or not the sensed orientation changes.

17. The method of claim 12, further comprising detecting an incoming phone call associated with a configuration other than the operating configuration.

18. The method of claim 17, further comprising answering the incoming call in response to one or more of the following: changing the orientation of the device to another orientation associated with the incoming phone call or a user input.

19. The method of claim 12, wherein the device comprises a first end having a first pattern and a second end having a second pattern.

20. The method of claim 12, further comprising configuring a video display to provide a user interface aligned with the determined orientation of the device.

21. The method of claim 12, wherein the sensed orientation may be one of a plurality of orientations each associated with one of a plurality of configurations, and wherein the processing portion configures the device to operate according to one configuration associated with the sensed orientation.

* * * * *